(12) United States Patent
Riabtsev et al.

(10) Patent No.: US 11,247,189 B2
(45) Date of Patent: Feb. 15, 2022

(54) METHOD OF PRODUCING GRANULAR SORBENT FOR EXTRACTING LITHIUM FROM LITHIUM-CONTAINING BRINE

(71) Applicant: Ecostar-Nautech Co., Ltd., Novosibirskaia oblast (RU)

(72) Inventors: Aleksandr Dmitriyevich Riabtsev, Novosibirsk (RU); Natalya Pavlovna Kotcupalo, Novosibirsk (RU); Valeriy Ivanovich Titarenko, Novosibirsk (RU); Larisa Timofeyevna Menzheres, Novosibirsk (RU); Elena Viktorovna Mamylova, Novosibirsk (RU); Aleksandr Aleksandrovich Kurakov, Novosibirsk (RU); Arkadij Valentinovich Ten, Novosibirsk (RU)

(73) Assignee: ECOSTAR-NAUTECH CO., LTD., Novosibirsk Aia Oblast (RU)

( * ) Notice: Subject to any disclaimer, the term of this patent is extended or adjusted under 35 U.S.C. 154(b) by 243 days.

(21) Appl. No.: 16/622,193

(22) PCT Filed: Jul. 3, 2018

(86) PCT No.: PCT/RU2018/050073
§ 371 (c)(1),
(2) Date: Dec. 12, 2019

(87) PCT Pub. No.: WO2019/059814
PCT Pub. Date: Mar. 28, 2019

(65) Prior Publication Data
US 2020/0129955 A1    Apr. 30, 2020

(30) Foreign Application Priority Data
Sep. 25, 2017  (RU) ................. 2017123383

(51) Int. Cl.
*B01J 20/08* (2006.01)
*B01J 20/02* (2006.01)
*B01J 20/04* (2006.01)
*B01J 20/30* (2006.01)

(52) U.S. Cl.
CPC ............. *B01J 20/08* (2013.01); *B01J 20/027* (2013.01); *B01J 20/041* (2013.01); *B01J 20/3028* (2013.01); *B01J 20/3042* (2013.01)

(58) Field of Classification Search
CPC ........ B01J 20/08; B01J 20/026; B01J 20/041; B01J 20/3028; B01J 20/3042
USPC ......................................................... 502/414
See application file for complete search history.

(56) References Cited

U.S. PATENT DOCUMENTS

| | | | |
|---|---|---|---|
| 4,347,327 A | 8/1982 | Lee et al. | |
| 6,280,693 B1 | 8/2001 | Bauman et al. | |
| 6,380,693 B1 | 4/2002 | Kastl | |
| 8,753,594 B1 | 6/2014 | Burba, III et al. | |
| 9,012,357 B2 | 4/2015 | Harrison et al. | |

FOREIGN PATENT DOCUMENTS

| | | |
|---|---|---|
| RU | 2009714 C1 | 3/1994 |
| RU | 2028385 C1 | 2/1995 |
| RU | 2050184 C1 | 12/1995 |
| RU | 2223142 C2 | 2/2004 |
| RU | 2234367 C1 | 8/2004 |
| RU | 2455063 C2 | 7/2012 |
| WO | 03041857 A1 | 5/2003 |

OTHER PUBLICATIONS

Ryabtsev A.D. Processing of multicomponent lithium-bearing hydromineral raw material based on its enrichment in lithium. Abstract of dissertation for the degree of doctor of tech. sciences. Tomsk, 2011.

*Primary Examiner* — Edward M Johnson
(74) *Attorney, Agent, or Firm* — Calfee Halter & Griswold LLP (57) ABSTRACT

Disclosed a method for the preparation of granular sorbent based on $LiCl \cdot 2Al(OH)_3 \cdot nH_2O$ for lithium recovery from lithium-containing brines, comprising production of a powder of $LiCl \cdot 2Al(OH)_3 \cdot nH_2O$ (DHAL-Cl) from aluminum chloride solution comprising lithium, separation of the powder DHAL-Cl from the obtained solution by centrifugation with further removing the excess LiCl, drying of the powder DHAL-Cl; and, granulation of the powder DHAL-Cl with the addition of chlorinated polyvinylchloride and a organochlorine solvent to obtain the granular sorbent based on $LiCl \cdot 2Al(OH)_3 \cdot nH_2O$; wherein the aluminum chloride solution comprising lithium is prepared by dissolving crystalline hydrate of hexaaqua aluminum chloride in aqueous solutions comprising lithium in the form of LiCl, Li2CO3, or LiOH.H2O or mixtures thereof, and concentration of aluminum chloride in the solution is 45-220 $kg/m^3$.

16 Claims, 6 Drawing Sheets

Fig. 1

| Properties | Methylene chloride | Trichlorethylene | Tetrachlorethylene (perchlorethylene) |
|---|---|---|---|
| Formula | $CH_2Cl_2$ | $CCl_2=CHCl$ | $CCl_2=CCl_2$ |
| Molecular weight, amu | 84,93 | 131,39 | 165,83 |
| Melting temperature, °C | -96,7 | -73 | -22,4 |
| Boiling temperature, °C | 40,1 | 86,7 | 121 |
| Density, kg/m$^3$ | 1336 | 1464 | 1625 |
| Water solubility (20°C), % | 2,0 | 0,027 | 0,04 |
| Solubility of water in a solvent (20°C), % | 0,142 | 0,02 | 0,008 |
| Area of ignition of vapors in air,% | from 12 to 22 | from 10,5 to 41 | X |
| Flash point, °C | 14 | 32 | X |
| Heat of evaporation, kJ / kg (20 °C) | 336,4 | 278,7 | 241,8 |
| Evaporation (relative to methylene chloride) * | 1 | 0,828 | 0,719 |
| Price, $/kg | 0,520 – 0,990 | 0,73 – 1,0 | 0,9 – 1,1 |
| * - the ratio of the heat of evaporation of the solvent to the heat of evaporation of MCL ||||

| Sample number of the obtained granulated sorbent DHAL-Cl | Static exchange capacity for LiCl, mg Li/g sorbent | Mechanical strength, % | Bulk weight, kg/dm$^3$ | Swelling, v/v% |
|---|---|---|---|---|
| № 1 | 6,1±0,1 | 98,9±0,2 | 0,75±0,02 | 2,9±0,1 |
| № 2 | 6,0±0,1 | 99,0±0,2 | 0,76±0,02 | 3,1±0,1 |
| № 3 | 6,2±0,1 | 99,2±0,2 | 0,77±0,02 | 3,1±0,1 |
| № 4 | 5,9±0,1 | 98,9±0,2 | 0,77±0,02 | 3,0±0,1 |
| № 5 | 6,0±0,1 | 99,2±0,2 | 0,78±0,02 | 2,8±0,1 |
| № 6 | 6,0±0,1 | 98,9±0,2 | 0,75±0,02 | 3,2±0,1 |
| № 7 | 6,1±0,1 | 99,0±0,2 | 0,76±0,02 | 2,9±0,1 |

Fig. 4

| Sample number | Ingredients content, % wt. | | | | |
|---|---|---|---|---|---|
| | unbound LiCl | bound LiCl | Al(OH)$_3$ | PVC | H$_2$O |
| № 8 | 0 | 12,1 | 60,3 | 8,5 | 19,2 |
| № 9 | 3,4 | 11,7 | 58,3 | 8,2 | 18,4 |

Fig. 5

| Sample number | Static exchange capacity for LiCl, mg Li/g sorbent | Mechanical strength, % | Bulk weight, kg/dm$^3$ | Swelling, v/v% |
|---|---|---|---|---|
| № 10 | 6,0±0,1 | 99,1±0,2 | 0,75±0,2 | 3,1±0,1 |
| № 11 | 6,1±0,1 | 99,0±0,2 | 0,76±0,2 | 3,0±0,1 |

Fig. 6

METHOD OF PRODUCING GRANULAR SORBENT FOR EXTRACTING LITHIUM FROM LITHIUM-CONTAINING BRINE

CROSS-REFERENCE TO RELATED APPLICATIONS

This application is a 371 of PCT Application No. PCT/RU2018/050073 filed on Jul. 3, 2018, which claims priority to Russian Application No. RU 2017123383 filed on Sep. 25, 2017, the contents of which are hereby incorporated by reference as if recited in their entirety.

FIELD OF THE INVENTION

The present invention relates to chemical material science, in particular to methods of producing an inorganic aluminum hydroxide sorbent for selective lithium recovery from natural brines or technogenic lithium-containing chloride salt solutions.

BACKGROUND OF THE INVENTION

An inorganic sorbent based on a hydrated composite material $LiCl/Al(OH)_3$ was applied for the selective lithium recovery from brines worldwide [1]. The sorbent is produced by reacting of commercial crystalline $Al(OH)_3$ (crystal size 140 μm or more) as gibbsite, bayerite or nordstrandite with lithium hydroxide in the presence of water at L: S=0.69 to form a composite material $LiOH/Al(OH)_3$. The resulting composite is further treated with a 20% solution of hydrochloric acid to obtain the sorption form of $LiOH/Al(OH)_3$. After separation of the solid phase from the mother liquor, the sorbent is rinsed with water to remove a part of LiCl from the structure.

When subsequent contacting of the sorbent with lithium-containing chloride brine, the deficiency of LiCl is filled. The lithium recovered from the brine is further desorbed with water. The sorption and desorption of lithium is carried out at 80° C. The disadvantages of the method include two-stage process and long duration of the synthesis of the sorbent, application of a strong hydrochloric acid solution and a high process temperature (80° C.) for sorption and desorption of lithium chloride. However, the major disadvantage of this sorbent is a mechanical destruction of its crystals during operation which makes its practical application impossible.

There is known a method of synthesis of a microcrystalline hydrated selective sorbent of formula $LiCl.2Al(OH)_3$ suspended directly within the macropores of the anion-exchange resin [2].

The method comprises the following stages:
a) Incorporating a freshly formed $Al(OH)_3$ into the pores of a resin by soaking the resin within saturated solution of $AlCl_3$ followed by treating with aqueous ammonia solution;
b) Washing the resin to remove excessive reagents;
c) Treating the resin containing $Al(OH)_3$ with a LiOH solution to obtain the intermediate compound $LiOH.2Al(OH)_3$;
d) treating of the resin containing intermediate compound with hydrochloric acid solution or lithium chloride solution to convert the intermediate compound into the compound $LiCl.2Al(OH)_3$.

The disadvantages of the method include, firstly, the complexity and the multiplicity of the synthesis process stages, secondly, rapid "washing out" of compound $LiCl.2Al(OH)_3$ (for 7 to 10 days from the beginning of sorbent application) from resin macropores during sorption-desorption cycles.

There is known a method of producing a granular selective sorbent for lithium recovery from brines by electrochemical dissolution of metallic aluminum in a concentrated solution of lithium chloride to form the compound $LiCl.2Al(OH)_3.m H_2O$, separating a sorbent phase from the solution phase, drying and granulating the dry sorbent powder with a binder (fluoroplastic powder) dissolved in acetone [3]. The disadvantages of this method of sorbent synthesis include: high power consumption of the electrochemical synthesis process, low productivity of the process and high explosion- and fire hazard of the granulation process, due to the use of acetone as a solvent.

PCT/DE2001/004062 discloses a method of producing a granular sorbent for lithium recovery from brines and a plant for its embodiment [4] that comprises a production of $LiCl.2Al(OH)_3.nH_2O$ powder by mixing an aluminum hydroxide with lithium chloride in the presence of a calculated amount water in a high-speed mixer for bulk materials with a stirrer and a treatment of the resulting mixture in a centrifugal activating mill to obtain a $LiCl.2Al(OH)_3.nH_2O$ powder with a particle size of 0.16 mm or less.

A granulation of the produced powder is carried out by extruding a paste obtained by mixing the sorbent powder with the PVC resin (binder) dissolved in methylene chloride. After distilling off methylene chloride vapors, the extrudate is crushed and classified to obtain product with granule size of 1.0 to 1.5 mm. The vapors of methylene chloride distilled during granulation are absorbed by Freon oil (grade XF-22c-16) from the carrier gas stream (air) to obtain a 20% solution of methylene chloride in oil, which is fed for thermal desorption of methylene chloride followed by condensation of its vapors and recycling the condensed phase of methylene chloride to sorbent production. The disadvantages of this method include a high power consumption of the $LiCl.2Al(OH)_3.nH_2O$ powder synthesis, low stability of the obtained compound and absence of reliable mechanical activation equipment. The above-mentioned disadvantages make it impossible to implement the method on an industrial scale.

RU Pat. 2223142 discloses a method of producing a sorbent for lithium recovery from brines [5] to eliminate the disadvantages of the previous method [4]. The technical result is achieved by a direct interaction of a mixture of crystalline aluminum chloride and lithium hydroxide in the presence of a small amount of water or their concentrated solutions to form $LiCl.2Al(OH)_3.mH_2O$. The interaction proceeds according to the reaction:

$$2AlCl_3 + 6LiOH + nH_2O \rightarrow LiCl.2Al(OH)_3.nH_2O + 5LiCl \qquad (1)$$

Despite the high quality of the product, its high stability and reproducibility, the significant disadvantage of this method is a high consumption of the most expensive commercial lithium product, lithium hydroxide. One mole of the resulting compound requires 6 moles of LiOH. In addition, the method is characterized by the presence of a large amount of lithium-containing waste products in the form of LiCl solution, which requires additional costs for lithium regeneration.

Later the same authors proposed a method of producing a sorbent for lithium recovery from brines, which is based on application of cheaper and less deficit $Li_2CO_3$ instead of LiOH for synthesis of $LiCl.2Al(OH)_3.nH_2O$ [6]. The solid phase of the product is formed according to the following reaction:

$$2AlCl_3 + 3Li_2CO_3 + (3+n)H_2O \rightarrow LiCl.2Al(OH)_3.nH_2O + 5LiCl + 3CO_2 \qquad (2)$$

At the same time, the byproduct of the reaction is easily converted to lithium carbonate by precipitation from the solution by soda according to the following reaction:

$$2LiCl+Na_2CO_3 \rightarrow Li_2CO_3\downarrow +2NaCl \quad (3)$$

The regenerated lithium carbonate is recycled to the production of the sorbent. Thus, only 0.5 mole of $Li_2CO_3$ is required to obtain 1 mole of $LiCl.2Al(OH)_3.nH_2O$ compound. However, this method has significant disadvantage, namely, a low rate of reaction (2) and consequently a long duration of sorbent synthesis, which takes several hours. In addition, the synthesis process is often accompanied by the formation of $LiCl.2Al(OH)_3.nH2O$ in gel state, which makes it difficult to separate the solid phase from the mother liquor. The process also does not provide granulation of the sorbent powder obtained.

RU Pat. 2455063 discloses a method of producing a granular sorbent for lithium recovery from brines [7] which is capable to eliminate the disadvantages of the above-described method. The method comprises producing a chlorine-containing species of double aluminum lithium hydroxide ($LiCl.2Al(OH)_3.nH_2O$) from an aluminum chloride solution by preliminarily mixing with a lithium hydroxide or lithium carbonate at atomic ratio Al:Li of 2.0 to 2.3 and adding NaOH to the mixed solution to set pH value of 6 to 7. The $LiCl.2Al(OH)_3.nH_2O$ precipitate is separated from the solution, dried, ground and granulated by adding of polyvinyl chloride and methylene chloride as solvent. The methylene chloride evaporated during granulation is regenerated and recycled to production process.

In terms of its technical essence and achieved result this method is considered to be the closest analogue of present invention and is chosen as the prototype of the present invention. However, in addition to the undoubted advantages, this method has the following disadvantages:

the application of filtration to separate the synthesized DHAL-Cl from the mother liquor leads to the formation of a very dense cake, which has to be crushed before proceeding to the next operation;

excessive content of lithium chloride in the finished product caused by unreasonably increased consumption of expensive lithium reagents when producing DHAL-Cl sorbent;

unreasonably long duration of a single-stage drying of DHAL-Cl powder;

high residual organic solvent content in the extrudate, which leads to increased consumption of the solvent, on the one hand, and deterioration of sanitary-hygienic labor conditions, on the other hand;

the unreasonably low value of the mechanical strength of the original DHAL-Cl particles obtained by crushing the degassed extrudate due to their irregular shape;

the methylene chloride regeneration system based on vapor absorption-desorption by oil with subsequent condensation into the liquid phase is not only bulky and difficult to operate, but also fire hazardous due to presence of a large volume of combustible vacuum oil;

high vapor pressure of methylene chloride due to its low boiling point (40° C.) leads to large losses of the solvent during extrusion;

use for the production of lithium-containing aqueous solution of $AlCl_3$ only expensive commercial lithium products, namely, $Li_2CO_3$ and $LiOH.H_2O$, whereas there are a whole number of lithium-containing by-products and waste-products which could be used successfully for preparing aluminium-lithium solution at a lithium production plant.

The proposed method of obtaining a granular sorbent for lithium recovery from lithium-containing brines as in-line process at a plant for fabrication of commercial lithium products retains all the advantages of the prototype and eliminates the above disadvantages.

SUMMARY OF THE INVENTION

The technical result that eliminates the above-mentioned disadvantages is achieved using the following techniques and operations.

The dispersed phase (powder) of double aluminum and lithium hydroxide (DHAL-Cl) is synthesized from a lithium-containing solution of aluminum chloride with a concentration of $AlCl_3$ of 45 to 220 kg/m³. The lithium-containing aluminum chloride solution is prepared by dissolving aluminum chloride hexahydrate in an aqueous solution containing the calculated amount of lithium which was introduced both in the form of individual (commercial) lithium compounds LiCl, $Li_2CO_3$, $LiOH.H_2O$, and in the form of mixtures of these compounds as well in the form of lithium-containing solutions and mixtures of lithium-containing solutions or in forms of mixtures of individual lithium compounds with lithium-containing solutions coming from the corresponding regeneration stages at a plant for fabrication of commercial lithium products LiCl, $Li_2CO_3$, $LiOH.H_2O$ from natural lithium-containing brines. Separation of DHAL-Cl dispersed phase from the mother liquor (aqueous NaCl solution) is carried out by centrifugation, and the obtained fugate is applied for the production of a disinfection solution of sodium hypochlorite. The separated DHAL-Cl dispersed phase is repulped in the calculated volume of water to remove excess of LiCl from DHAL-Cl by desorption into the liquid phase while stirring the pulp for 20 to 30 minutes. The pulp is centrifuged, the obtained fugate (aqueous LiCl solution) is recycled to the operation of preparing a lithium-containing solution of aluminum chloride, and DHAL-Cl dispersed phase is subjected to a two-stage drying, wherein DHAL-Cl is first dried by heated air in fluidized bed at temperature 70 to 75° C. until the residual moisture content is 9.5 wt. %, then DHAL-Cl is subjected to the vacuum drying with stirring at temperature 60 to 65° C. until the residual moisture content is 1.5-2.0 wt. 0%.

The dried and ground DHAL-Cl powder is mixed with a previously prepared solution of chlorinated polyvinyl chloride (CPVC resin) in organochlorine solvent which could be not only methylene chloride, but also trichloroethylene, tetrachlorethylene or mixtures thereof, to form a paste. The prepared paste is extruded through a drawing nozzle with orifice diameter of 5 mm. The extrudate is brought into countercurrent contact with the air stream heated to 120-130° C. to evaporate the organochlorine solvent. After air degassing stage, the extrudate is fed to the vacuum degassing stage under a pressure of 0.4-0.6 atm. After degassing, the extrudate is subjected to crushing and classification by feeding the recycle (fine fraction of granulated DHAL-Cl) to the paste preparation operation. DHAL-Cl granules with a size of at least 1.0 mm and not more than 2.0 mm are pelletized to obtain the sorbent granules of a rounded shape, thereby to increase their mechanical strength and to recycle the screening product to the paste preparation operation.

The air stream cooled during the degassing of the extrudate and saturated with vapors of an organochlorine solvent or a mixture of their vapors is fed to compression under pressure of 6 atm which is accompanied by cooling the air-vapor stream to −3° C. and condensation of vapors of an organochlorine solvent or a vapor mixture of organochlorine solvents and water. The separation of the condensed phase from the gas phase is carried out by mist elimination, and the separation of an organochlorine solvent or a mixture of organochlorine solvents from water is carried out by decantating.

After separation the condensed phase, the compressed air-vapor stream is fed to deep cooling to −15° C. which is accompanied by deep condensation of the vapors of an organochlorine solvent or a vapor mixture of organochlorine solvents into the liquid phase and water vapor into the ice crystals, followed by separation of the condensed phases from the air flow and separation of the condensed phases into solid (ice) phase and liquid (organochlorine solvent or a mixture of organochlorine solvents) phase. Decompression of the air stream separated from the condensed phases is carried out by heating to 0° C. Thereafter the purified and dried air stream is heated to 120-130° C. and recycled to the extrudate degassing operation.

After combining liquid condensed phases of an organochlorine solvent or a mixture of organochlorine solvents obtained during compression and deep cooling of the air-vapor stream, the liquid solvent is recycled to dissolve the chlorinated polyvinyl chloride. The combined phase of ice crystals and a liquid condensed phase from the air-vapor compression operation is fed to the operation of preparing a lithium-containing solution of $AlCl_3$.

In comparison with the prototype the proposed solutions have the following advantages:

1. Reducing a production price of granular DHAL-Cl due to reducing the consumption of lithium-containing reagent, when synthesis of the dispersed phase of DHAL-Cl, replacing expensive commercial lithium products with lithium-containing by-products and waste products obtained, for example, from natural lithium brines or the excess LiCl contained in the synthesized DHAL-Cl, simplification of a system for recovery of organochlorine solvent;

2. Increasing the mechanical strength of the granulated sorbent DHAL-Cl;

3. Reducing the fire hazard of a production;

4. Reducing the emission of an organochlorine solvent vapors into the air of the working area and the environment.

The reality of achieving the technical result is confirmed by the description of the technological scheme for production of granular DHAL-Cl sorbent.

DETAILED DESCRIPTION OF THE INVENTION

In accordance with the technological scheme (FIG. 1), the main technological conversion stages of the industrial fabrication of lithium products, for example, the fabrication of lithium products from lithium-containing hydromineral raw materials, are following ones: sorption enrichment of the brine in relation of lithium chloride, followed by removal of the brine residue and obtaining a primary lithium concentrate with LiCl content no more than 10 kg/m$^3$; concentrating of the primary lithium concentrate to obtain a productive concentrate with LiCl content from 60 kg/m$^3$ to 480 kg/m$^3$, according to which lithium product is require; obtaining the commercial lithium products from the productive lithium concentrate as a lithium carbonate of technical grade, lithium carbonate of battery grade, lithium hydroxide monohydrate of brands LGO-3, LGO-2. LGO-1, lithium chloride of technical grade. Each of the commercial products can be used as a starting reagent for the preparation of lithium-containing aqueous solutions of $AlCl_3$ and synthesis of the dispersed phase of a chlorine-containing species of double aluminum and lithium hydroxide ($LiCl \cdot 2Al(OH)_3 \cdot nH_2O$).

Figure 1:
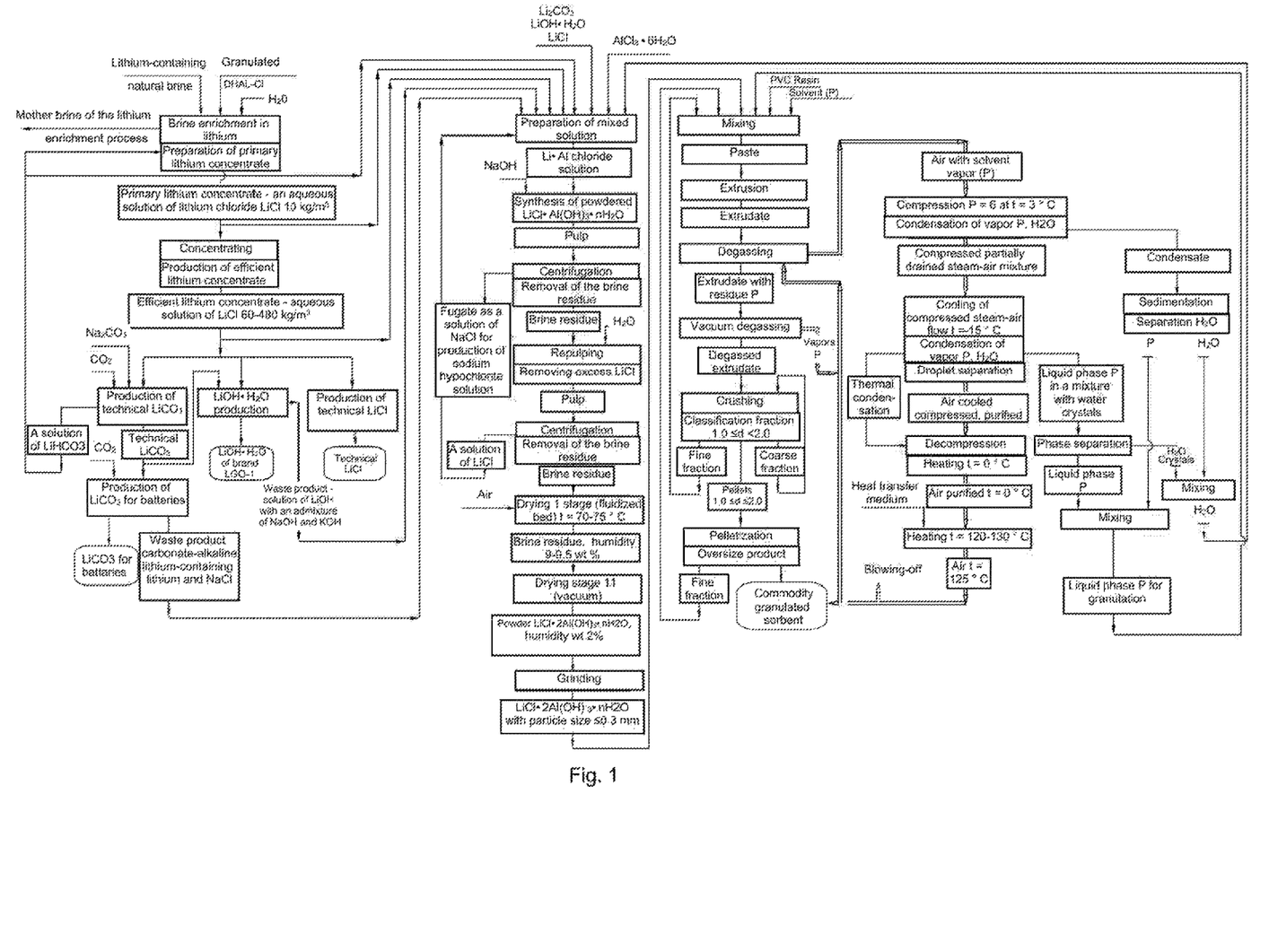
FIG. 1 is a technological scheme for producing a granular sorbent for lithium recovery from lithium-containing brines wherein the present invention is applied as in-line process at a plant for fabrication of commercial lithium products.

The process of obtaining an aqueous lithium aluminum chloride solution from commercial lithium products is described by the following chemical equations:

$$H_2O + AlCl_3 + Li_2CO_3 \rightarrow AlCl(OH)_2 + 2LiCl + CO_2 \uparrow \quad (1)$$

$$H_2O + AlCl_3 + LiCl \rightarrow AlCl_2(OH) + LiCl + HCl \quad (2)$$

$$LiOH \cdot H_2O + AlCl_3 \rightarrow AlCl_2(OH) + LiCl + H_2O \quad (3)$$

Since there is no strict requirement to the content of impurities in a mixed lithium aluminum chloride solution, the preparation of that solution can be carried out not only from commercial lithium products, but also from technogenic lithium-containing materials and waste products in the form of a solution or solution mixtures. So, a mixed lithium aluminum water solution can be prepared from a primary lithium concentrate (LiCl solution of concentration 10 kg/m$^3$ with NaCl and KCl admixture), a productive lithium concentrate (concentrated LiCl solution with NaCl and KCl admixture), which are obtained from the corresponding processing stages in the calculated quantities. In addition, an effective reagent for the preparation of a mixed lithium aluminum chloride solution can be a solution of lithium bicarbonate, which is an industrial intermediate in the production of lithium carbonate of battery grade. In this case, the chemical description of the process is as follows:

$$LiHCO_3 + AlCl_3 \rightarrow AlCl_2(OH) + LiCl + CO_2 \uparrow \quad (4)$$

The initial reagents for the preparation of a mixed lithium aluminum chloride aqueous solution can be the following ones: a waste product when producing a lithium carbonate of battery grade, namely, the lithium carbonate alkaline solution containing NaCl and KCl as the main impurities; a waste product when producing LiOH.H2O, namely, the LiOH solution containing NaOH and KOH as impurities.

The optimum range of aluminum concentrations in the mixed lithium aluminum chloride aqueous solution is 45 to 220 g/dm$^3$ in $AlCl_3$ equivalent. When the content of $AlCl_3$ below 45 g/dm$^3$, the precipitated DHAL-Cl begins to be water-saturated and poorly separated from the mother liquor, and when $AlCl_3$ above 220 g/dm$^3$ mother liquor is supersaturated in NaCl and the precipitate DHAL-Cl is charged with crystals of sodium chloride.

The mixed lithium aluminum chloride aqueous solution is brought into contact with 1.0-2.5N NaOH solution added portionwise with stirring until the pH of the resulting pulp is adjusted to 6.5-7.0. The resulting pulp is centrifuged, separating the liquid phase (aqueous NaCl solution) from the solid phase of the synthesized compound $LiCl.2Al(OH)_3.nH_2O$. The liquid phase (fugate) is used either as a productive solution for the preparation of crystalline sodium chloride by evaporation and drying, or as a make-up solution to produce a sodium hypochlorite disinfection solution made from NaOH and $Cl_2$ by membrane electrolysis of aqueous NaCl solution.

The synthesized solid phase of the compound $LiCl.2Al(OH)_3.nH_2O$ (DHAL-Cl) is mechanically discharged from the centrifuge by a screw (without grinding of the solid phase) and pulped in a predetermined volume of fresh water and stirred for 20-30 minutes to remove excess LiCl from phase of DHAL-Cl into the liquid phase. The resulting aqueous LiCl solution is separated from DHAL-Cl by centrifugation of the pulp. An aqueous solution of LiCl (fugate) is used to prepare a mixed lithium-aluminum chloride aqueous solution.

Centrifuged DHAL-Cl is dried. The drying of DHAL-Cl should proceed at a temperature in the drying zone that excludes the production of highly crystallized material. In order to achieve maximum performance DHAL-Cl is dried in two stages: at first DHAL-Cl is dried by heated air in fluidized bed at temperature 70 to 75° C. until the residual moisture content is 9.0 to 9.5 wt. %; then DHAL-Cl is dried at 60-65° C. in the vacuum drying mode with stirring until the residual moisture content is 1.5-2.0 wt. %. Dry powder DHAL-Cl is ground to a particle size of <0.1 mm.

Figure 2:
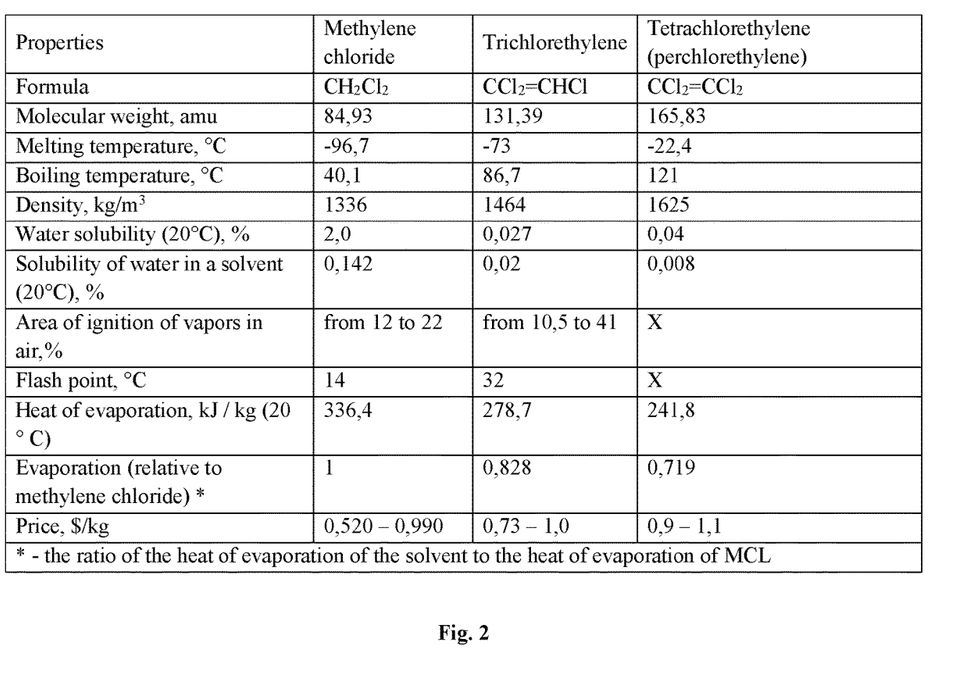
FIG. 2 is a table listed the properties of organic solvents used for granulation of DHAL-Cl powder.
Figure 3:
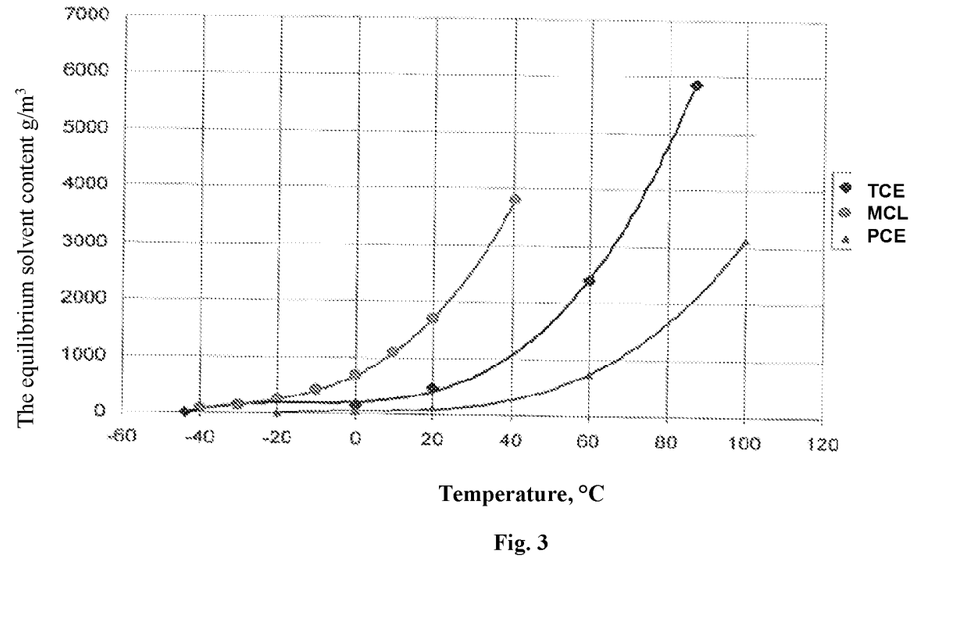
FIG. 3 is a vapor pressure-temperature diagram for trichloroethylene (TCE).
Figure 4:
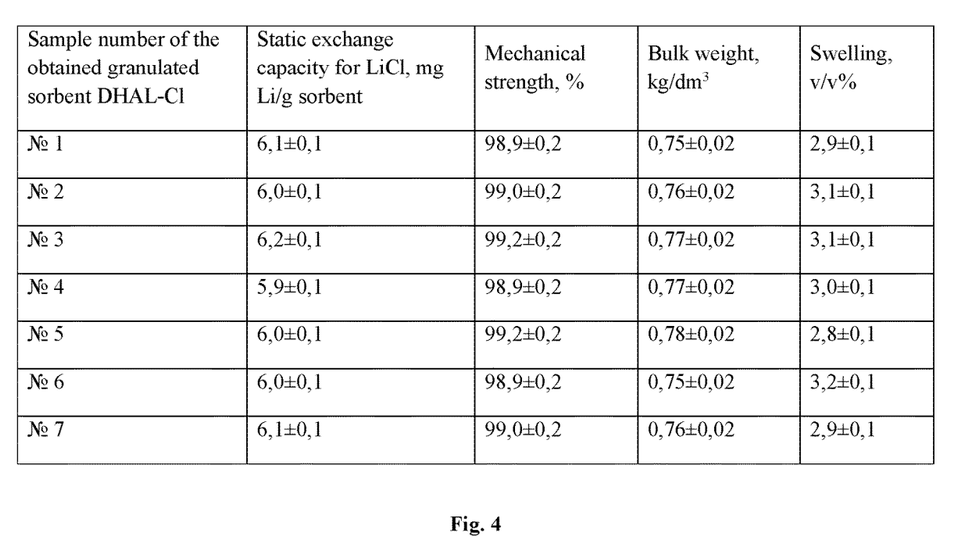
FIG. 4 is a table of results obtained when testing the samples of granular DHAL-Cl sorbent, produced by using mixed lithium-containing aqueous solutions of $AlCl_3$ from various lithium-containing sources.

The ground powder is mixed with a chlorinated polyvinyl chloride (CPVC plasticizer) powder and organic solvent which is either methylene chloride or trichlorethylene or tetrachlorethylene (perchlorethylene), or mixtures thereof to form a homogeneous paste. The paste is extruded through a drawing nozzle with orifice diameter of 5 mm. The orifice diameter of 5 mm is optimal, it ensures the highest yield of the product of a given size with a sufficiently high degree of degassing of the extrudate. The extrudate is degassed in a countercurrent contact with the air stream. As follows from the table and the vapor pressure-temperature diagram of the solvents shown in FIGS. 2 and 3, the use of tetrachlorethylene is preferable due to the minimization of solvent loss during the production of paste and extrusion, the minimum solubility of water in the solvent, the minimum heat of evaporation, which ultimately minimizes the loss during recovery and the maximizes the recycle to production of the regenerated solvent with high quality.

A more complete removal of the solvent from the extrudate is provided by vacuum treatment under pressure of 0.4 to 0.6 at. The degassed extrudate is crushed and classified. The fine fraction is fed to the mixing operation (preparation of the paste), and the DHAL-Cl granules of size in the range ≥1.0 mm and <2.0 mm are pelletized to give the granules a round shape, the fine fraction is screened and also fed to the mixing operation. Commercial granulated DHAL-Cl is packaged into drums.

The air stream saturated with solvent vapors (P) is fed to compression (under pressure 6 at and temperature −3° C.), to condense partially the solvent and water vapor into the liquid phase and separate the liquid phase from the air-vapor mixture by mist elimination. The water phase is separated from solvent phase by decantating. The compressed air-vapor mixture passed through the mist elimination stage is cooled to a temperature of −15° C. to condense the solvent vapor into the liquid phase, and water vapor into the crystals, and to separate them from the air flow also by mist elimination. The condensed liquid phase of the solvent is separated from the ice crystals, mixed with the solvent condensed in the compression operation and fed to a mixing operation. The ice crystals are mixed with water phase condensed when compressing and used for obtaining a mixed lithium aluminum chloride aqueous solution. This technological process makes it possible to increase the recovery rate of low-boiling solvents up to 97 to 99%.

The cleaned and dried air stream is heated to a temperature of 120 to 130° C. and fed to an air degassing operation of the extrudate.

It is possible to realize the process of solvent recovery in one stage by freezing. In this case a recovery rate of methylene chloride 94 to 95% could be provided when cooling the air-vapor stream to −70° C. If trichlorethylene or tetrachlorethylene is used as a solvent, the recovery rate of 97% or more is achieved when cooling the air-vapor flow to −15° C. The choice of this or that variant of solvent recovery is carried out on the basis of the results of technical and economic calculations performed at the stage of investment justification for the practical implementation of the development.

Example 1

In laboratory conditions, comparative tests of the sorption-desorption properties of batches of the granulated sorbent DHAL-Cl, made from various lithium-containing materials in accordance with the process flow diagram shown in FIG. 1.

Sample No. 1 was produced using a mixed lithium aluminum-containing aqueous chloride solution obtained by dissolving 385.1 g of $AlCl_3.6H_2O$ in a 3.03 liters carbonate-alkaline aqueous solution of the composition (g/dm$_3$): lithium in terms of $Li_2CO_3$—10.9000; SO4—0.0531; Ni—0.0016; Pb—0.0075; Cu—0.0060; Na—0.5056; Ca—0.0209; Mg—0.0138; Fe—0.0006; B—0.0938; Cl—0.7502; pH=9.7, which is a real waste of production of lithium carbonate of battery quality, from technical lithium carbonate.

Sample No. 2 was produced using a mixed lithium aluminum-containing aqueous chloride solution obtained by diluting with water to a total volume of up to 1 liter the mixture of 403.5 g of $AlCl_3.6H_2O$ with 0.17 liters of depleted catholyte with composition (g/dm$_3$): LiOH—120; NaOH—3.5, which is a waste product of $LiOH.H_2O$ from lithium carbonate or lithium chloride.

Sample No. 3 was produced using a mixed lithium aluminum-containing aqueous chloride solution obtained by dissolving 403.4 g of $AlCl_3.6H_2O$ in a 1.0 liter lithium bicarbonate solution ($LiHCO_3$ content—63.5 g/dm$_3$).

Sample No. 4 was produced using a mixed lithium aluminum-containing aqueous chloride solution obtained by dissolving 403.2 g of $AlCl_3 \cdot 6H_2O$ in 3.82 liters of a primary chloride lithium concentrate of composition (g/dm$_3$): LiCl—10.40; NaCl—0.20; KCl=0.1; $MgCl_2$=0.02; $CaCl_2$=0.04; B—0.005; $SO_4$—0.03, which is a by-product of the production of technical lithium carbonate from natural lithium brine.

Sample No. 5 was produced using a mixed lithium aluminum-containing aqueous chloride solution prepared by mixing 0.39 liters of an aqueous solution of lithium bicarbonate, 1.50 liters of a primary lithium concentrate, 1.25 liters of a lithium carbonate-alkaline solution and 403.2 g of $AlCl_3 \cdot 6H_2O$.

Sample No. 6 was prepared using a mixed lithium aluminum-containing aqueous chloride solution prepared by mixing 403.1 g of $AlCl_3$ with 0.097 liters of a production lithium concentrate of composition (g/dm$_3$): LiCl—481, KCl+LiCl<4.0 g/dm$_3$ followed by adding water to bring the total volume of the solution to 1 liter.

Sample No. 7 was produced using a mixed lithium aluminum-containing aqueous chloride solution obtained by mixing 403.3 g of $AlCl_3 \cdot 6H_2O$ with 40.7 g of technical Li2CO3, produced from lithium natural brine, with the addition of water to bring the total volume of the solution to 1 liter.

As an alkaline reagent, 1.0N NaOH solution was used to prepare all the samples. Trichlorethylene was used as a solvent in the granulation. The obtained samples of granulated DHAL-Cl sorbents were tested for the following parameters: static exchange capacitance for LiCl, mechanical strength, bulk density, swelling according to the methods specified in TU2133-23599583-2002 "Sorbent for selective lithium extraction". For testing, the lithium natural brine of the Znamensky deposit of the Irkutsk region was used (g/dm$_3$): LiCl—2.2; NaCl—6.1; KCl=8.2; $MgCl_2$=115; CaCl2—330; Br is 8.3; SO4=0.6; B=0.3; $SrCl_2$—3.6 pH—5.1 and distilled water. As follows from the obtained results presented in the table in FIG. 3, all seven samples have almost identical characteristics in terms of exchange capacity and mechanical strength, which confirms the possibility of using a wide spectrum containing lithium in the form of chloride, carbonate, hydroxide, including waste products of commercial lithium products, for the synthesis of granular sorbent as lithium starting reagents.

At the same time, the impurities contained in the lithium-bearing waste do not adversely affect the characteristics of the synthesized granular sorbent.

Example 2

Using as an initial reagent $AlCl_3 \cdot 6H_2O$, $Li_2CO_3$ technical, distilled water, PVC resin, methylene chloride as an organic solvent, two samples of the granular sorbent DHAL-Cl were prepared.

Figure 5:
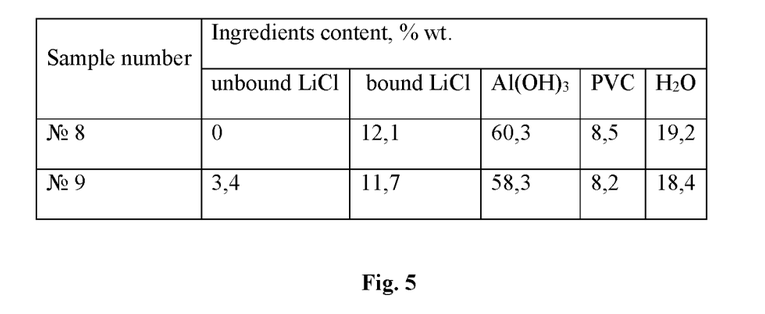
FIG. 5 is a table used to compare chemical compositions of granular DHAL-Cl sorbent samples with preliminary removal of lithium chloride from the synthesized dispersed phase of DHAL-Cl and without preliminary removal.
Figure 6:
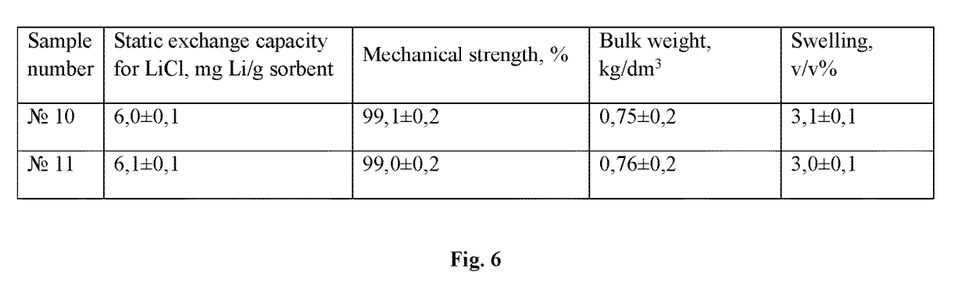
FIG. 6 is a table of results obtained when testing the samples of granular DHAL-Cl sorbent after previous removing a free (excessive) lithium chloride, but before drying, grinding and granulation of DHAL-Cl dispersed phase in comparison with the sample passed the step of removing free lithium chloride after granulation and cooling.

Sample No. 8 was manufactured strictly according to the process schedule provided by the circuit in FIG. 1. Sample No. 9 differed from sample No. 8 in that the operation procedure for removing excess LiCl from the synthesized dispersed phase of DHAL-Cl was excluded from the technological procedure. Samples of 0.2 kg were sampled from each of the samples, which were tested according to the methods presented in Example 1. Before testing, samples of sorbents were analyzed in order to determine their initial quantitative composition. In this case, sample No. 9 was brought into contact with 0.5 dm3 of distilled water prior to testing to remove excess lithium chloride and dried to constant weight in a vacuum drier. The results of the chemical analysis of the quantitative composition of the starting samples are shown in the table in FIG. 5. Test results—in the table in FIG. 6. From the obtained results it follows that the test parameters of the compared samples are identical. However, the removal of excess lithium at the stage of synthesis of the dispersed phase of DHAL-Cl allows, firstly, to return to production the sorbent at the stage of synthesis of 22.5% of expensive lithium chloride from the amount of lithium chloride used, and second, to eliminate the need for a granular sorbent preparation operation for use in direct use.

Example 3

Using as technical reagents $AlCl_3 \cdot 6H_2O$, $Li_2CO_3$ technical, distilled water, PVC resin and various organic solvents (methylene chloride, trichlorethylene and tetrachlorethylene), three samples of the granular sorbent were obtained according to the process flow diagram (FIG. 1). Sample No. 10—solvent methylene chloride, sample No. 11—solvent trichlorethylene, sample No. 12—solvent—tetrachlorethylene. The obtained samples were tested for mechanical strength. The mechanical strength of the tested samples was as follows (%): sample No. 10—99.1±0.1; sample No. 11—99.0±0.1; sample No. 12—99.1±0.1. The difference in the mechanical strength of the tested DHAL-Cl samples of granulated, obtained using various solvents, is within the error of the determination.

Example 4

A sample of the dispersed phase of DHAL-Cl was prepared from the reagents described in Examples 2 and 3, which, after removing free LiCl, was divided into two equal portions. The portions were dried each separately to a residual moisture content of 2% by weight. Sample No. 13 was dried in one step on a vacuum drier. Sample No. 14 was dried in two stages: in the fluidized bed at the first stage to a residual moisture content of 9 wt. %; in the evacuation mode (under pressure 0.6 atm) during torsion. It took 12 hours 40 minutes to dry sample No. 13. The total drying time of sample No. 14 was 3 hours 37 minutes. The transfer of the technological process to two-stage drying allows almost three-fold reduction in the drying time.

Example 5

A batch of granular sorbent DHAL-Cl was prepared according to the technology of FIG. 1. After completion of the technological redistribution and classification, degassed extrudate, the resulting batch of DHAL-Cl of the predetermined granule size was divided into two equal parts. One sample (sample No. 15) was tested for mechanical strength without pelletizing. The second sample (sample No. 16) was pelletized in a rotating drum for 75 minutes and after the screening of the fine fraction was also tested for mechanical strength. Sample No. 15 showed a mechanical strength of 97.7±0.2%. Sample No. 16 showed a mechanical strength of 99.0±0.2%. Tests have shown that pelletizing of crushed DHAL-Cl particles by more than 1% increases its mechanical strength.

Example 6

Two samples of granulated DHAL-Cl sorbent were produced by the process schedule (FIG. One sample (sample No. 17) using commercial tetrachlorethylene as an organic solvent. Another sample (sample No. 18) using reclaimed tetrachlorethylene, which was obtained by freezing (−15° C.) from the vapor-saturated circulating air stream to obtain an aggregate batch of granular DHAL-Cl. Sample No. 17 showed a mechanical strength of 99.1%, sample No. 18 was 99.0%. The difference was within the margin of error, which confirms the suitability of the recovered organic solvent for granulating the DHAL-Cl powder.

The invention claimed is:

1. A method for the preparation of a granular sorbent based on $LiCl.2Al(OH)_3.nH_2O$ for lithium recovery from lithium-containing brines, the method comprising:
preparation of a powder of $LiCl.2Al(OH)_3.nH_2O$ (DHAL-Cl) from aluminum chloride solution comprising lithium with addition of an alkaline reagent;
separation of the powder DHAL-Cl from the obtained solution by centrifugation with further removing excess LiCl,
drying the powder DHAL-Cl; and
granulation of the powder DHAL-Cl with the addition of chlorinated polyvinylchloride and an organochlorine solvent to obtain the granular sorbent based on $LiCl.2Al(OH)_3.nH_2O$;
wherein the aluminum chloride solution comprising lithium is prepared by dissolving crystalline hydrate of hexaaqua aluminum chloride in an aqueous solution comprising lithium in the form of $LiCl$, $Li_2CO_3$ or $LiOH.H2O$ or mixtures thereof, and concentration of aluminum chloride in the solution is from 45 to 220 $kg/m^3$.

2. The method according to claim 1, wherein the alkaline reagent is sodium hydroxide and sodium hydroxide is added to adjust pH to 6-7.

3. The method according to claim 1, wherein the removing of excess LiCl is carried out by pulping the powder DHAL-Cl in water followed by further centrifugating and recovering the powder DHAL-Cl.

4. The method according to claim 1, wherein the excess LiCl separated from the powder DHAL-Cl is directed to the stage of preparing the aluminum chloride solution comprising lithium.

5. The method according to claim 1, wherein the atomic ratio of Al:Li in the aluminum chloride solution comprising lithium is from 2.0 to 2.3.

6. The method according to claim 1, further comprising grinding the powder DHAL-Cl before granulation.

7. The method according to claim 6, wherein grinding is carried out to a particle size ≤0.10 mm.

8. The method according to claim 1, wherein drying of the powder DHAL-Cl represent two-stage drying.

9. The method according to claim 8, wherein the two-stage drying of the powder DHAL-Cl comprises, at the first stage, heating with air in the fluidized bed mode, maintaining temperature in the drying zone from 70 to 75° C. to residual moisture content in DHAL-Cl from 9.0 to 9.5% by weight; and at the second stage, vacuum drying with stirring and maintaining temperature in the drying zone from 60 to 65° C. to residual moisture content in DHAL-Cl from 1.5 to 2.0% by weight.

10. The method according to claim 1, wherein granulation comprises preparing a paste from powder DHAL-Cl with chlorinated polyvinylchloride with an organochlorine solvent; extruding the prepared paste followed by subjecting the extrudate to countercurrent contact with heated airflow to separate the extrudate from the organochlorine solvent, directing the extrudate to a vacuum degassing stage, followed by subjecting the extrudate to crushing and classification.

11. The method according to claim 10, wherein the organochlorine solvent is selected from methylene chloride, trichlorethylene and tetrachlorethylene or a mixture thereof.

12. The method according to claim 10, wherein the airflow saturated with vapors of the organochlorine solvent or a mixture of organochlorine solvent vapors is directed to compressing stage to recover the organochlorine solvent or a mixture of organochlorine solvent vapors, which are returned to granulation stage.

13. The method according to claim 12, wherein the compressing stage includes:
compressing the airflow saturated with vapors of the organochlorine solvent or a mixture of organochlorine solvent vapors to the pressure of 6 atm, while cooling to −3° C., to obtain a liquid phase of the organochlorine solvent or a mixture of organochlorine solvent vapors and water, followed by separation of the condensed phase from gaseous phase by fogging with settling and separation of phases of the organochlorine solvent or a mixture of organochlorine solvents from water;
deep cooling to −15° C. of compressed air-vapor stream with deep condensation of the vapors of the organochlorine solvent or a mixture of organochlorine solvent vapors to a liquid phase and condensation of water vapor to ice crystals, followed by separation of the condensed phases from the air stream and separation of the condensed phases into a solid ice phase and liquid organochlorine solvent; decompression of the air flow separated from the condensed phases by heating to 0° C.; heating the air stream to 120-130° C. and directing it to the stage of heated air treatment of the extrudate; recovering the liquid condensed phases of the organochlorine solvent or a mixture of organochlorine solvents.

14. The method according to claim 13, wherein after combining the ice crystals with the liquid condensed water phase, the water phase is directed to the stage of preparing the aluminum chloride solution comprising lithium.

15. A granular sorbent based on compound $LiCl.2Al(OH)_3.nH_2O$ with a defective structure, having mechanical strength from 98.9±0.2% to 99.2±0.2% and static exchange capacity for LiCl, mg Li/g, sorbent, from 5.9±0.1 mg to 6.2±0.1 mg.

16. A granular sorbent based on compound $LiCl.2Al(OH)_3.nH_2O$ with a defective structure, obtained by the method of claim 1.

* * * * *